United States Patent [19]

Bagge

[11] 3,727,574

[45] Apr. 17, 1973

[54] OUTBOARD DRIVE FOR A BOAT

[75] Inventor: Nils Olof Bagge, Goteborg, Sweden

[73] Assignee: AB Volvo Penta, Goteborg, Sweden

[22] Filed: Aug. 30, 1971

[21] Appl. No.: 175,841

[52] U.S. Cl. ............... 115/34 R, 115/17, 74/410, 74/665 P
[51] Int. Cl. ............................................. B63h 5/00
[58] Field of Search ............... 115/34, 35, 41, 17, 115/18; 74/410

[56] References Cited

UNITED STATES PATENTS

| | | | |
|---|---|---|---|
| 2,536,005 | 12/1950 | Knuth | 115/34 R X |
| 3,368,420 | 2/1968 | Alexander, Jr. | 115/34 R X |
| 3,492,966 | 2/1970 | Kiekhaefer | 115/17 |
| 3,520,272 | 7/1970 | Ellzey | 115/35 |

*Primary Examiner*—Milton Buchler
*Assistant Examiner*—Carl A. Rutledge
*Attorney*—George H. Baldwin et al.

[57] ABSTRACT

An outboard drive for a boat having a generally horizontal propeller shaft driven through gearing from two generally vertical rigid drive shafts between which the torque is shared. The drive shafts are gear connected in the upper part of the unit by transmission gears arranged to pump oil within the unit housing and the two shafts are driven by a single shaft from a power source. The transmission gears are so adjusted on their respective shafts as to cause the torque to be equally divided between the two drive shafts.

8 Claims, 3 Drawing Figures

INVENTOR
NILS OLOF BAGGE
BY George H. Baldwin
Attorney

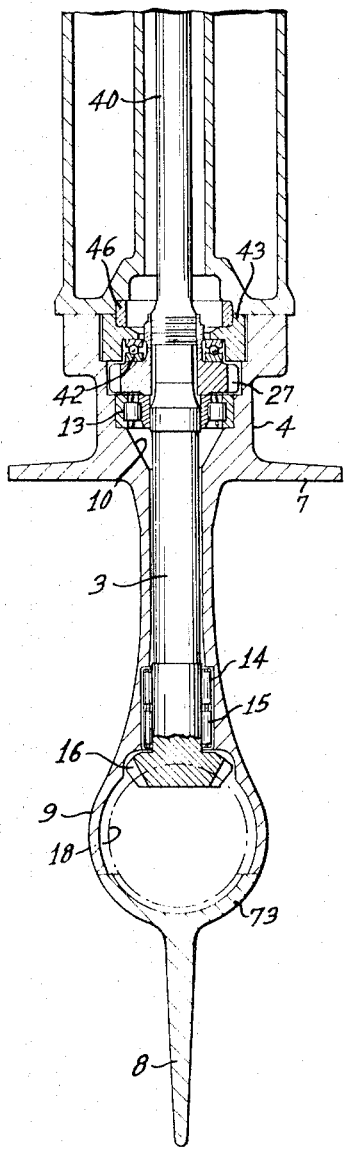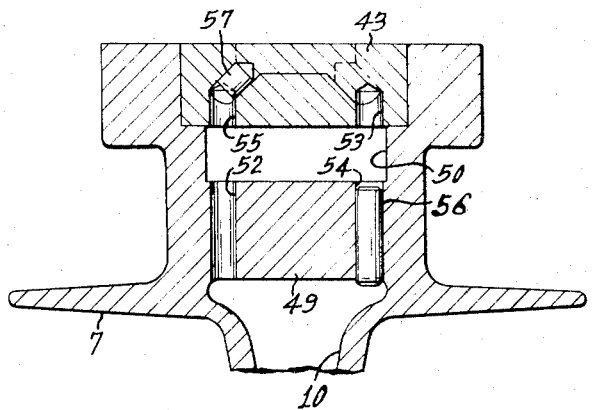

OUTBOARD DRIVE FOR A BOAT

This invention relates to outboard drive arrangements for boats of the type comprising a plurality of upright drive shafts for transmitting torque to a generally horizontal propeller shaft in the lower end portion of the outboard housing of the unit, to a method of adjusting the transmission so that the torque is equally divided between the upright shafts, and to an arrangement in the outboard housing such that lubricating oil is pumped by the transmission.

It is known to provide two vertical drive shafts in an outboard drive unit to transmit torque to a horizontal propeller shaft, such as is shown, for example, in U.S. Pat. Nos. 3,492,966 and 3,259,100. The principal advantage of such units over single drive shaft units is that the gears in the propeller shaft housing portion of the outboard leg may be smaller, permitting that portion of the housing to be of lesser frontal area and, consequently, characterized by less drag, and, further, that the intermediate portion of the housing may be somewhat thinner, also, since two or more small diameter shafts are capable of transmitting the same torque as a single shaft of greater diameter.

It will be apparent that the full advantages of the twin or multiple drive shaft unit are obtained only when, under conditions of maximum torque transmission, the torque is substantially exactly equally divided between the shafts. U.S. Pat. No. 3,492,966 teaches the use of torsionally deflecting shafts to partially equilize the division of torque between the shafts. Torsion shafts, however, are prone to vibrate, and such vibration imposes extra loads on the housing, gears, shafts and other components.

According to the present invention, stiff or rigid drive shafts are employed, having minimal torsional deflection, and it has been fournd that two important advantages accrue, that the tendency to torsional vibrations of torsion shafts, particularly that which results from rapid changes in propeller torque, is substantially eliminated, and that flexing forces on the outboard housing are reduced, making possible a smaller and thinner-walled housing. The structure according to the invention and the method of assembling and adjusting the structure to insure substantially equal division of torque are described hereinafter.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 2 is a sectional view taken along line 2—2 of FIG. 1; and

FIG. 3 is a detail sectional view on an enlarged scale taken along line 3—3 of FIG. 1.

Figure 1:
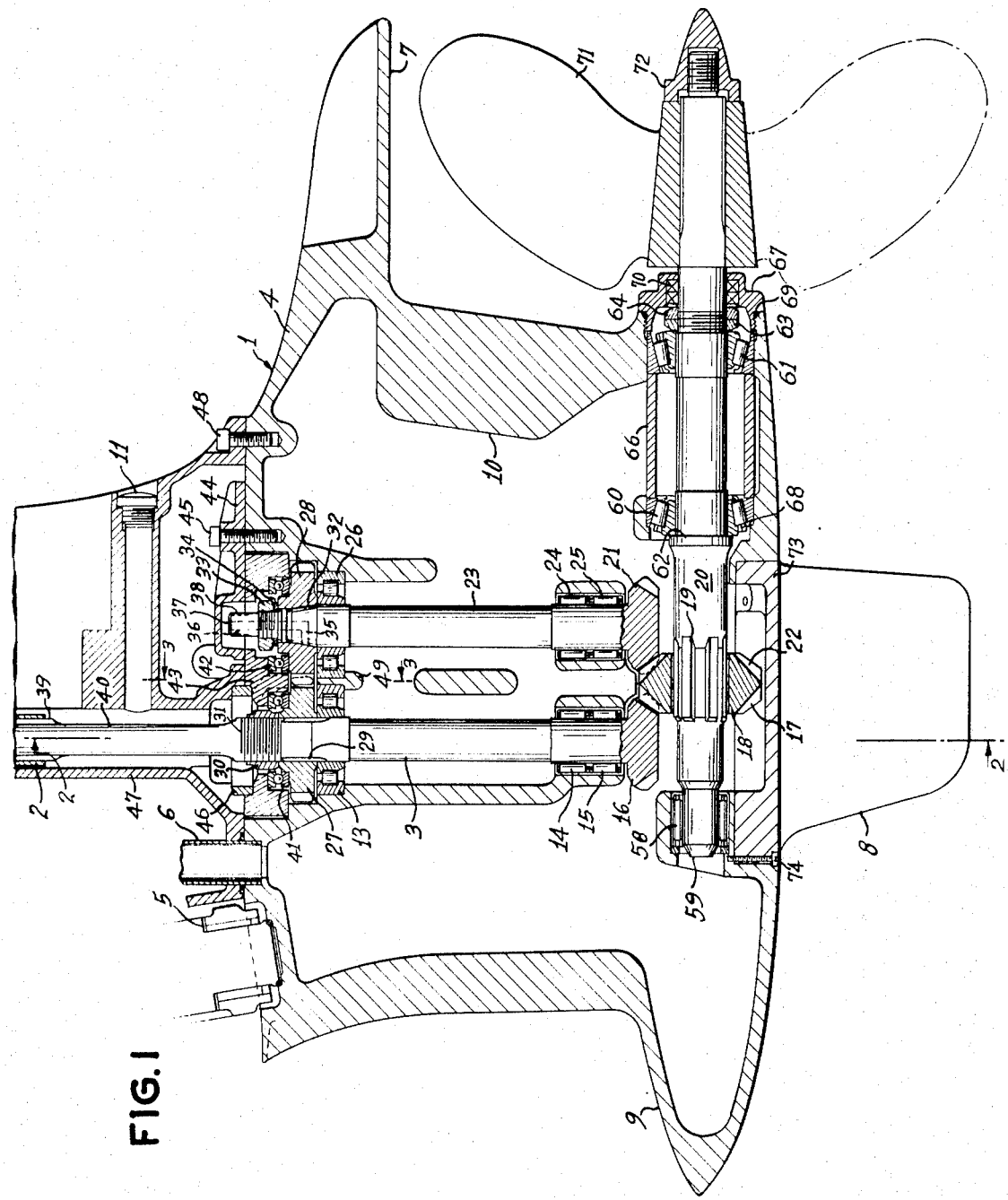
FIG. 1 is a partial side elevation of an outboard drive unit with parts broken away and in section illustrating the invention.

The outboard drive unit 1 as shown comprises the underwater and intermediate portions of the outboard assembly of ain inboard-outboard drive arrangement, the engine, universal joints and transmission gearing in the drive train from the engine and portions of the upper outboard housing being omitted as forming no part of this invention.

The outboard drive unit 1 is furnished with power from a suitable source, such as an engine, drive train and transmission, constituting, with a drive coupling 2, means to drive a main drive shaft 3 which extends generally vertically in the outboard housing 4. The housing is provided with means 5 for swingable mounting to a boat and with a lubricating oil return connection 6. The housing further includes an anticavitation plate 7, skeg 8, and a propeller shaft housing portion 9. The hollow interior chamber 10 of the housing is filled with lubricating oil through an oil fill opening 11.

Shaft 3 is mounted for rotation in housing 4 by roller bearings 13 disposed spacely above its lower end, and by long needle bearings 14 and 15 adjacent its lower end. An integral bevel gear 16 is formed at the lower end of shaft 3 meshing with teeth 17 of a dual bevel gear 18 drivingly connected by splines 19 to and entrained on propeller shaft 20. Gear 18 has freedom of movement along the splines in a direction axially of shaft 20, but, as hereinafter explained, this gear is restrained from substantial movement by gear 18 and by a companion gear 21 in mesh with the second set of teeth 22 of the dual bevel gear 18.

Gear 21 is formed at the lower end of and integrally with a second or auxiliary upright drive shaft 23 spaced from shaft 20 in the direction of travel, that is, with one of the shafts directly in front of the other. Shaft 23 is preferably parallel to shaft 18, and is mounted similarly thereto in long needle bearings 24 and 25 disposed immediately above gear 21 and by a roller bearing 26 disposed spacedly thereabove.

Shaft 23 is driven from shaft 3 by meshed spur gear wheels 27 and 28, gear wheel 27 being ridigly fixed to shaft 3 by splines 29 and by a nut 30 engaged on threads 31 formed in the shaft, the nut being screwed tight against the gear wheel. Gear wheel 28 is internally tapered to fit tapered upper portion 32 of shaft 23 and is retained in fixed position thereon by nut 33 threadedly engaged on the shaft, a compression washer 34 being interposed between the nut and gear wheel. While it is preferred that the gear wheel 28 and shaft portion 32 be taper fitted, it has been found that satisfactory results are obtained if this spur gear wheel is provided with a cylindrical bore and is shrunk fitted onto a cylindrical portion of the shaft.

Shaft 23 is provided at its upper end with an internal oil passage drilled therein including a passage 35, opening through the surface of the shaft portion 32 on which the gear 28 is engaged, and further including a communicating passage 36 which opens through an exposed end portion 37 of the shaft. Shaft 23 is arranged to receive an adjusting lever or wrench thereon by means of which torque is applied to the shaft for original adjustment, such as by being provided with suitable side flats 38 on the exposed portion of the shaft above nut 33. Shaft 3 is also adapted to receive a lever or wrench thereon above nut 30, for example on splines 39, whereby torque may be applied to this shaft.

The manner of adjusting the mechanism to provide that torque, during maximum forward driving torque transmittal, or full load forward drive condition, is evenly divided between shafts 3 and 23 is as follows. With nuts 30 and 33 tightened down against the spur gear wheels, a clamp is placed on propeller shaft 20 and engaged against housing portion 9 to hold the propeller shaft against rotation in the housing, and levers or wrenches are engaged on shafts 3 and 23 above or immediately adjacent the respective spur gear wheels 27 and 28, while oil under high pressure is supplied into bore 36 of shaft 23. The oil pressure is selected to be sufficient to expand gear wheel 28 and to form an oil film between shaft portion 32 and the gear wheel whereby the shaft may rotate with respect to the gear wheel. The levers are now rotated against each other with the lever on shaft 3 applying torque thereto in the direction tending to cause forward rotation of the propeller shaft and equal to one-half of the maximum drive torque which is to be employed. Assuming that the direction of such torque application to shaft 3 is counter-clockwise, tending to turn shaft 20 clockwise, an equal torque is similarly applied by means of the respective lever to shaft 23 in a clockwise direction which also tends to rotate shaft 20 clockwise. Each of shafts 3 and 23 is thus subjected to one-half of the full load torque in the direction to which each shaft will be required to transmit the torque in forward drive operation, and while this torque is being applied by the levers, the oil pressure is released on passageway 35, 36 to cause gear wheel 28 to contract on shaft portion 32 and thus to become fixed thereon.

Gear wheels 27 and 28 are so fitted as to have no appreciable play, i.e. to have substantially zero clearance between their engaged teeth. While the portions of shafts 3 and 23 extending between gear wheel 27 and gear 16 and between gear wheel 28 and gear 21, respectively, are stiff and designed to have minimal deflection under torque, nevertheless they will very slightly deflect or twist under maximum torque conditions. When adjusted as described, however, the torque transmitted to the propeller shaft will be substantially exactly divided between the drive shafts under maximum or full load torque conditions. When less than full load torque is being applied, the division of torque between the shafts may be somewhat less equal, but under no such conditions, of course, will the torque on either shaft exceed the torque applied thereto under full load conditions and the torque on neither shaft will exceed the designed capacity of the shaft.

The gears 16 and 21 are integral with the drive shafts to reduce torsional deflections. As taught in the prior art, by dividing the torque between two drive shafts, as opposed to using a single drive shaft, the gears 16, 18 and 21 can be substantially smaller in forward aspect and the drive shafts can be of less diameter, all contributing to a narrow housing profile. In contrast to the prior art torsion shaft arrangements, however, the use, according to the present invention, of stiff shafts 3 and 23 permits long needle bearings 14, 15 and 24, 25, having longer life than would short bearings which torsion shafts would require. The combination of two stiff shafts, long bearings, and equal division of torque permits the housing 4 to be formed with thinner walls, with closer spacing around the gears 16, 18 and 21 and to the other internal components, and, with an external configuration narrower and with less drag than in prior art arrangements.

Section 40 of shaft 3 between gear wheel 27 and drive means 2 is preferably a torsion shaft to absorb shock load changes occasioned, for example, by the propeller entering and leaving the water during rough weather or as a result of striking a submerged object during operation. While the use of torsion shafts in place of stiff drive shafts 3 and 23 (below gear wheels 27 and 28) would increase the likelihood of vibrations under such shock load conditions, it has been found that there is minimal tendency toward vibrations when only the input shaft portion 40 is arranged to twist to absorb shock loads.

Each of shafts 3 and 23 is provided with a ball thrust bearing at 41 and 42 respectively above the spur gear wheels thereon to retain the bevel pinions 16 and 21 against the teeth of gear 18 with very little or no substantial clearance.

The thrust bearings 41 and 42 seat against a plug member 43 retained by a cap 44 bolted by bolts, such as bolt 45, to the housing portion 9 and by a collar 46 retained under the upper housing portion 47, which, in turn, is bolted by bolts such as bolt 48 to the lower housing portion 9.

Web 49, which is formed integrally and internally of lower housing portion 9, together with plug 43, define a chamber 50 for gear wheels 27 and 28, and these members are so bored that the gears comprise a gear pump operative to suck lubricating oil from the hollow interior or housing chamber 10 through a bore or passageway 52 of the web into the chamber 50 and to forcefully eject oil upwardly from chamber 50 through passageway 53 of the plug 43 and into the interior of the upper housing portion to lubricate the mechanism therein and such mechanism thereabove as it may be desired to supply coal oil to. Such mechanism may include, for example, gearing (not shown) which is in the drive chain for driving shaft 3. The oil may further circulate through the drive engine and the hot oil returns therefrom through tubes or pipe connection 6 into chamber 10 for cooling.

In order to adapt the gear pump for right or left hand drive, a set of bores 54 and 55 duplicating bores 52 and 53, respectively, are provided in web 49 and plug 43, but these bores 54 and 55 are closed by plugs 56 and 57 for drive operation in one direction, e.g. for a left hand rotating propeller, whereas the plugs 56 and 57 would be removed from bores 54 and 55 and placed in bores 52 and 53 for operation in the other direction, e.g. for a right hand rotating propeller.

The propeller shaft 20 is mounted for rotation in a roller bearing 58 at its forward end 59 and in tapered roller thrust bearings 60 and 61 disposed rearwardly therealong aft of double bevel gear 18. The inner race of bearing 60 engages against shoulder 62 on the propeller shaft and is oriented to take the thrust when the propeller is being operated in reverse, while bearing 61 is oppositely oriented to take the propeller thrust during forward drive of the boat. Double nuts 63, 64 are threaded on shaft 20 and bear rearwardly on the inner race 65 of bearing 61. Sleeve 66 is engaged between the outer races of the bearings, and shaft log 67 is screwed into housing portion 9 against the outer race of bearing 61 thereby, through sleeve 66, to retain the outer race of bearing 60 against a shoulder portion 68 interiorly of the housing. A rubber O-ring 69 seals the threaded shaft log joint, and the log houses suitable shaft packing 70. Propeller 71 is carried on shaft 20 outwardly of the housing, being retained thereon by cap nut 72.

A section 73 of housing portion 9 may be formed integrally with skeg 8 to provide access to gears 18, 16 and 21 upon disengagement of its mounting bolts, such as bolt 74.

While unit 1 is shown as an outboard drive unit for an inboard engine, it will be apparent that the unit is equally adaptable for use with an outboard engine, with which it would constitute a so-called outboard motor.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. In an outboard drive for a boat comprising a housing having a lower end portion, a propeller shaft in said lower end portion, a first drive shaft geared to said propeller shaft and extending upwardly therefrom and having an upper end, driving means connected to the upper end of said shaft, and an auxiliary drive shaft having a lower end geared to said propeller shaft and extending upwardly therefrom in spaced parallel relation to said first drive shaft, each said shaft being provided with a respective gear wheel fixed thereon spacedly above said propeller shaft, said drive being characterized in that said gear wheels are in close meshing engagement, the portions of said shafts below said gear wheels are substantially rigid against torsional deflection forces, one of said gear wheels is selectably adjustable in radial position on its respective said drive shaft and is adjusted thereon in position substantially exactly evenly to divide between said drive shafts the torque applied therethrough to said propeller shaft under maximum operating torque condition.

2. The combination according to claim 1 wherein said lower end portion comprises an oil reservoir, said gear wheels are enclosed, and oil conduits connect from one side of the meshing teeth in the gear wheel enclosure into said lower portion and from the other side of the meshing teeth in the gear wheel enclosure outwardly of said housing whereby rotation of said wheels pumps oil through said conduits.

3. The combination according to claim 1 further characterized in that said first drive shaft comprises a torsionally deflectable portion between its said upper end and the respective gear wheel thereon.

4. The combination according to claim 1 wherein said one of said gear wheels is disposed on said auxiliary drive shaft.

5. The combination according to claim 1 wherein said one of said gear wheels is adjustable on its respective drive shaft by means for temporarily introducing a film of liquid under high pressure between such gear wheel and shaft for thereby expanding the internal diameter of the gear wheel to free it for rotative movement with respect to its shaft.

6. An outboard boat drive assembly comprising a housing, an upstanding main drive shaft means in said housing including an upper drive shaft end comprising a drive attachment for drive means for the assembly and said drive shaft means further including an intermediate position and a rigid shaft portion extending downwardly from said intermediate position to a lower end, said shaft means between said intermediate position and said drive attachment comprising a torsion shaft, an auxiliary shaft including a rigid shaft portion disposed in side-by-side relation to said rigid shaft portion of said main drive shaft means, said housing having a lower end portion with a generally horizontal propeller shaft therein and extending therefrom, a propeller on said propeller shaft exteriorly of said housing, a double bevel gear keyed on said propeller shaft interiorly of said lower end portion of said housing, said auxiliary shaft having a lower end, a respective bevel gear on each said lower end, each said bevel gear being entrained with said double bevel gear, a pair of gear wheels in side-by-side close meshing engagement with substantially zero clearance between their engaged teeth, attachment means fixing one of said gear wheels on said rigid shaft portion at said intermediate position and second attachment means fixing the other of said gear wheels on said rigid shaft portion of said auxiliary shaft spacedly above said lower end thereof, one of said attachment means being releasable and the gear wheel which is fixed thereby being fixed in the position on its respective rigid shaft portion which such gear wheel assumes when, with its said attachment means released and with said propeller shaft restrained against rotation, torque equal to one-half of full load torque is applied in the respective forward drive direction to each said rigid shaft portion at or above the position of the said gear wheel thereon.

7. The combination in accord with claim 6 wherein said rigid shaft portions are offset from each other in a direction parallel to said propeller shaft, a respective long roller bearing is provided for each said rigid shaft portion n said housing immediately adjacent the bevel gear thereon, and said housing comprises an exterior anti-cavitation plate disposed below said gear wheels and spacedly above said bevel gears, and wherein that portion of said housing which is below said anti-cavitation plate is of thin walled construction closely conforming internally to the sides of said bevel gears and said double bevel gear, of said long roller bearings, and of said rigid shfat portions.

8. In a outboard drive for a boat comprising a housing carrying a generally horizontal propeller shaft at its lower end and having a main drive shaft and an auxiliary drive shaft disposed in generally upright parallel relation therein, said shafts having lower ends each provided with a respective first bevel gear, said propeller shaft having a double bevle gear keyed thereto disposed between said respective first bevel gears and on its opposite sides in close mesh therewith, a respective gear wheel on each of said upright shafts spacedly above said first bevel gears, said gear wheels being in close meshing engagement with substantially zero clearance between their engaged force transmitting teeth, said main drive shaft having an upper end portion extending above it said gear wheel and being adapted to be driven at its said upper end portion, said drive shafts being substantially rigid against torque deflection throughout the portions thereof extending between their lower ends and the gear wheels thereon throughout the power range of the drive, each said drive shaft being provided with means adjacent the gear wheels thereon through which torque may be temporarily applied by external means and means for temporarily loosening one of said gear wheels on its respective drive shaft whereby upon concurrent blocking of said propeller shaft against rotation, externally applying full load torque to said drive shafts by said torque applying means in directions to tend to cause forward propeller rotation, and loosening of said one gear wheel on its shaft, the said one gear wheel becomes adjusted in position around its shaft to take up clearances between said bevel gears and to compensate for residual torque deflections in said rigid portions of said shafts so that, upon disabling of said loosening means, said gear wheels, bevel gears and drive shafts are balanced to equally divide the drive torque between said drive shafts during full load forward drive condition.

* * * * *

PO-1050
(5/69)

UNITED STATES PATENT OFFICE
CERTIFICATE OF CORRECTION

Patent No. 3,727,574     Dated April 17, 1973

Inventor(s) Nils Olof Bagge

It is certified that error appears in the above-identified patent and that said Letters Patent are hereby corrected as shown below:

Column 1, line 36, "fournd" should read -- found --
Column 1, line 63, "ain" should read -- an --
Column 2, line 13, "spacely" should read -- spacedly --
Column 2, line 28, after "and" insert -- it --
Column 6, line 38, "n" should read -- in --
Column 6, line 46, "shfat" should read -- shaft --
Column 6, line 53, "bevle" should read -- bevel --

Signed and sealed this 22nd day of January 1974.

(SEAL)
Attest:

EDWARD M. FLETCHER, JR.　　　　RENE D. TEGTMEYER
Attesting Officer　　　　　　　　Acting Commissioner of Patents